June 21, 1955

P. F. M. GLOESS 2,711,526

METHOD AND MEANS FOR OUTLINING
ELECTRIC CODED IMPULSE TRAINS

Filed March 28, 1951

INVENTOR
Paul F. M. Gloess
By Ralph B. Stewart
attorney

United States Patent Office 2,711,526
Patented June 21, 1955

2,711,526
METHOD AND MEANS FOR OUTLINING ELECTRIC CODED IMPULSE TRAINS

Paul François Marie Gloess, Paris, France, assignor to Societe d'Electronique et d'Automatisme, Paris, France, a corporation of France Application March 28, 1951, Serial No. 217,981

Claims priority, application France March 29, 1950

12 Claims. (Cl. 340—167)

The present invention relates to a method and to means for carrying out outlining operations on an electric impulse train which has been coded by assigning to the impulses of its recurrent moments, amplitude levels proportional to coefficient values of the corresponding rank terms in the developed writing of a numerical value in a particular numeration system, most generally a binary numeration system.

Moreover, in order to simplify the disclosure, only the binary numeration system will be considered here and, in this case, the coded train on which the operation is performed reproduces through presence and absence of impulses in its moments (pulse intervals), of maximum number N, the configuration of the numerical development:

$$a_0 + a_1.2 + a_2.2^2 + \ldots (a_k-1).2^{k-1} + \ldots (a_n-1)2^{N-1}$$

in which $0, 1, 2 \ldots K-1, \ldots N-1$ are the orders of the terms of respective weights $1, 2, 4 \ldots 2^{K-1}, \ldots 2^{N-1}$. The moments of the train are N in number; the train has, therefore, a total duration $N\theta$ if $\theta$ designates the individual duration of one moment. Furthermore, it will be supposed, in order to further simplify the disclosure, that these moments are distributed in time to correspond to the development in the direction of the increasing orders or weights. (The first moment of the train, of order 0, having the weight 1, the second moment, of order 1, having the weight 2, and so on.)

Accordingly, a train which carries a numerical magnitude the development of which comprises, starting from the term of rank $K$, only zero terms, appears in the form of a series of impulses which in the first $K-1$ moments an impulse may be present or absent in each moment, then an impulse is present at moment $K$ after which no more impulse appears until moment N. In other words, K represents the moment of the last pulse in the code train.

The outlining operations which are considered here are to be understood as follows: the coded trains, in a transmission or calculation system, must always be considered as having a fixed total duration $N\theta = T$, a period of slow timing imposed on the system. Normally, consequently, the first moment of these trains coincides with the beginning of this period T regardless of its effective duration, that is to say, whatever is the moment order of this train, or the moment from which no more impulses are supplied.

By "outlining" of a train of this type is meant, the operation which consists in multiplying the coefficient value which it carries by such a numerical value $2^{mn}$ than $n$ is equal to $(N-K)/m$ or to the entire value minus this quotient with $m = 1, 2 \ldots$, in order to bring the term of order $K-1$ of the train, either to the location of the order moment $N-1$ when $m$ is equal to 1, or to any location of a lower order moment, the nearest possible with respect to that of order $N-1$ when $m$ is chosen with a value different from the unity and when $(N-K)/m$ is no integer.

It is quite obvious that such an outlining operation cannot be predetermined, but that it essentially depends upon the composition or make-up of each train to be outlined, and the general object of the invention is to provide a method and means for carrying out said method for the purpose of performing this outlining operation.

Stated in another way, the "outlining" operation of the invention involves the re-transmission of a coded train of pulses after a certain time delay which varies with the composition of the train. Specifically, the amount of delay interposed in the re-transmission of the train is determined by the position of the last pulse K of the train within the time T. The amount of delay is made proportional to the number of vacant code moments between the last pulse K in the train and the end of the period T.

Another object of the invention is to provide for retaining a memory of the outlining in order to perform later a "re-outlining" of the train itself or of the train resulting from the combination of the first one, after outlining, with one or more other trains which may or may not be outlined.

Another object of the invention is to make it possible to perform a multiple outlining through one single operation.

Finally, a further object of the invention is to make it possible not only to provide a memory of the performed outlining or outlinings, but also a memory of the coded train itself in its original setting with respect to the duration T of slow transmission timing in the system in which is incorporated such an outlining operator.

In order to realize these objects, the present invention provides an outlining method which substantially consists first in counting, from the first moment of a train, and during N consecutive moments, all the moment "groups" in which no impulse exists, starting again from zero each time an impulse appears in the coded train, the number of moments in a counting "group" being determined by the choice of the value of number $m$ (1, 2, ...); then registering or recording the counted number $(n)$ and utilizing this number to introduce into the transmission of the train a delay of $nm\theta$ where $\theta$ is the duration of a moment of the train (and $m\theta$, the duration of a counting group of moments); thus, effectively insuring the desired carry over of the moment representing therein the term of the highest order $K-1$. Then, after further working of the so outlined train, for example, by combination or mixing with other coded trains, the registering of counted number $n$ is utilized again in order to outline again in a predetermined manner the coded train resulting from this working; this method being further characterized by the performance of one or both of the following operations:

(a) delaying the train by $N\theta = T$ before applying the delay $nm\theta$ either through simple delay $N\theta$ or, and this, more particularly, in order to retain the memory thereof, by introducing it into a looped transmission channel of electric length $N\theta$;

(b) performing this counting according to the chosen number $m$ of moments in each group of moments for the counting, registering the counted number $n$ and introducing into different tapping paths delays $mn\theta$. $(m-1)n\theta$, ..., $n\theta$ into any desired choice of said delays.

A registering operator in accordance with the invention for carrying out said method then comprises, a single input channel for the coded train to be registered, a delay transmission line and a shunt line in order to apply the existing impulses of the entering train as return-to-zero or re-setting impulses, on a step-by-step counter actuated through another line by a series of impulses of $m\theta$ timing, the individual outlets of the counter stages actuating an equal number of switches connected to regularly spaced taps on the delay transmission line; the outlets of said switches being connected to a single outlet line, while the outlets of the counter stages also actuate an equal number of different switches for recording, with a view to a later re-outlining; the spacing of the taps along the delay line being chosen equal to $m\theta$ for a simple outlining and, in case a multiple outlining is desired, said operator then incorporates as many sets of switches as there are desired outlinings, these sets of switches being connected to taps with spacings chosen in the series $m\theta$, $(m-1)\theta, \ldots \theta$. Furthermore, and according to whether a memory of the incoming train is to be kept or not within its own outlining, the delay transmission line may consist of a time delaying line, with a period of traveling time equal to $N\theta$, looped on itself through a regenerating impulse stage of a first delaying line with a period of running time $N\theta$ followed by a second delaying line comprising the above-mentioned extracting taps, of maximum time run $(N-1)=\theta$.

This outlining method and the operators embodying the same are fully disclosed in the following description of various arrangements shown by way of diagrammatic examples, in the accompanying drawings in which.

Figure 1:
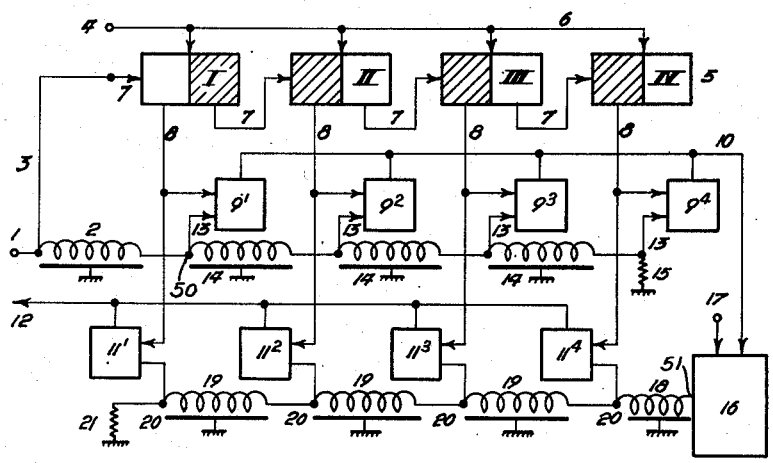
Fig. 1 is an arrangement of an outlining operator for a single value of $m$ with an initial delay of the incoming train through a non-looped transmission path of delay $N\theta$ (a particular example of re-outlining arrangement is also shown in Fig. 1)

In order to simplify the drawing, the case of a step-by-step counter with four stages has been chosen; however, it is clear that the system may be extended to a larger number of stages.

In these figures, the corresponding elements are designated with the same reference numerals.

Referring to Fig. 1, the coded impulse train with N moments to be outlined is applied onto the inlet terminal 1 whence it runs through a first delaying line 2 of electric length $N\theta$; simultaneously, it is applied through the shunt path 3 to the return-to-zero or re-setting path 7 of a step-by-step counter 5 with four flip-flop stages I—II—III—IV arranged in cascade. This counter is normally operated by means of channel 6 from terminal 4 which during the time of application T of the coded train at 1, receives a series of counting impulses recurring at intervals of $m\theta$. The individual outlets 8 of the flip-flop stages I to IV control, in first line, four switching stages 9 with a common outlet 10 and, in second line, the four switching stages 11 with a common outlet 12, so that any predetermined condition of a flip-flop stage unlocks the corresponding switches 9 and 11 in order to make them operative as conductors and that any reverse condition locks said switches.

Each of said switches 9 is controlled by the corresponding tap 13 of a delaying line following line 2, and the sections 14 of which have an electric length $m\theta$; this line is terminated on its characteristic impedance 15 and it is clear that it may comprise, at the utmost, as many sections less one as there are stages in the counter or, in other words, may only comprise $N/m-1$ sections of an individual length $\theta$, taps 13 being spaced by $m\theta$.

Outlet 10 may then control an operator circuit 16, the function and the make-up of which are not to be precisely described here since they are not concerned with the invention. Said operator circuit receives, at 17, another coded train with which the registered train is to be combined. The outlet of operator 16 is formed, after a first delaying section 18, of desired electric length (for example, $m\theta$) of a delaying line provided with as many sections 19 as there are sections 14 in the outlining line and of the same electric length. Taps 20 of this line control switches 11. Of course, this latter part of the diagram is shown only by way of illustration since any other desired re-outlining through a predetermined delay at 18 and (or) modification of the spacings of taps 20 may be insured at will from the recording performed on switches 11 in order to retain the memory of the outlining (if desired, furthermore, said memory could be retained on flip-flop stages apart from the counter after recording).

Applying the series of timed impulses onto the step-by-step counter causes the latter to progress by one stage for each counting impulse received at 4, but any impulse of the coded train applied through shunt path 3 returns the counter to zero and, accordingly, at the end of the counting, the number registered or displayed by the counter corresponds to the number of impulses applied at 4 which followed the last impulse applied at 7 from the coded train; this displayed number $(n)$ shall, therefore, be equal to the direct value or to the entire value less $(N-K)/m$.

The displayed number determines which of switches 9 is finally unlocked in order to give passage to the coded train which at this moment reaches the inlet 50 of the tapped line, the train having been delayed by $nm\theta$ in line section 2. Likewise, it determines which of switches 11 is finally unlocked in order to retain the memory of the outlining.

In case $m=1$ the number $(n)$ exactly corresponds to the number of the train moments which show no impulses after moment K; if $m=2$ said number $(n)$ corresponds to the number of pairs of moments which show no impulses from that moment K or, if K is an odd number, and N an even number, to said number of pairs of moments less one, and so on.

Of course, the step-by-step counter 5 must be such that its general condition of zero insures the unlocking of switch 9 connected to the first tap 13 at the entrance of the tapping line; also, it must be such that any impulse applied at 7 causes its return to the general zero condition even if, at this moment, a counting impulse is applied to the same through terminal 4. It will be seen further that such counters are already known in the technics. Switches 9 and 11 preferably consist of electron tube stages.

Now, if a multiple outlining is desired and, for example, both in order to simplify the disclosure and because this case frequently occurs in practice, the coded train must be extracted according to an outlining which provides, in two distinct outlets, a multiplication of its code by $2^{mn}$ and by $2^n$ ($m=2$ on the diagram of Fig. 2); counter 5 receives from terminal 4 a series of impulses of timing $2\theta$ and two sets of switches 9 and 22 are provided, switches 9 being connected to line taps with a spacing $\theta$ and switches 22 to line taps with a spacing $2\theta$ from the inlet terminal of a line with six sections 14 of individual length equal to $\theta$. The number $(n)$ displayed at the end of the counting operation corresponds to the number of pairs of moments of the incoming coded train which shows no impulse after the order $K-1$, or to the entire value minus said number. The outlined train extracted at 10 has its code multiplied by $2^n$ and the outlined train extracted at 23 has its code multiplied by $2^{2n}$; in other words, the train extracted at 23 is delayed by $2n\theta$ while the train extracted at 10 is delayed by $n\theta$. Such an arrangement makes it possible to operate on trains of a duration $N\theta$ with a number of stages $N/n$ of the step-by-step counter.

In fact, the recording on switches 22 does insure the multiplication by 2 of number $(n)$ displayed on the counter because of the spacing $2\theta$ between the connection taps of these switches. As a result, for every different value of number $m$ the counting may be performed by reducing to $m\theta$ the impulse timing of the counting pulses applied at 4, and it will be possible to obtain any outlining involving a delay from $mn\theta$ to $n\theta$ by providing sets of switches with spacings from $m\theta$ to $\theta$ between their connection taps.

Figure 3:
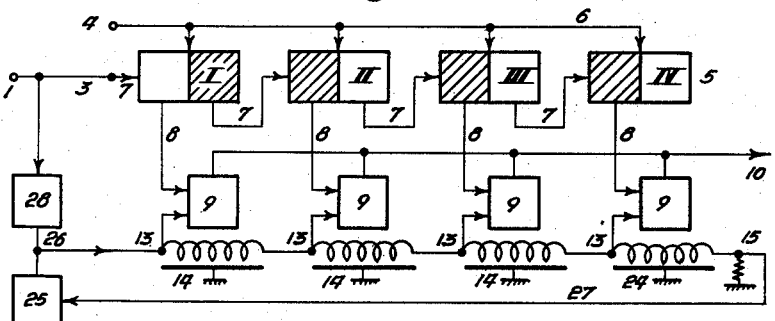
Fig. 3 is a similar arrangement to that of Fig. 1, but with a looped memory delaying transmission channel.

The provision of the first delaying line section 2 insures correct extracting of the re-outlined train; however, said line section may be omitted if, as diagrammatically shown in Fig. 3, the electric length of the tapped line is extended to $N\theta$ through the addition of a terminal section 24 and if the re-injection of the coded train which has passed through this line is obtained through an impulse regenerating stage 25 connected between the output of section 24 and the input of the first section 14. It is quite clear that the extracting of the registered train is to take place only after a first run of the loop, that is to say, after a time $T=N\theta$, but this is rigorously the case in the arrangements with delay line 2 of the preceding figures, while the arrangement of Fig. 3 offers the complementary advantage of retaining the memory of the non-outlined train (if switches 9 are then all returned to zero after the extraction) or of the outlined train if that switch chosen by a counting remains open.

In the diagram of Fig. 3, a unidirectional conductive device is shown at 28 which prevents the train at 25 from actuating the step-by-step counter at each of its revolutions in the memory loop which is closed by conductor 27 on stage 25 connected to inlet terminal 26 of the outlining line.

Figure 2:
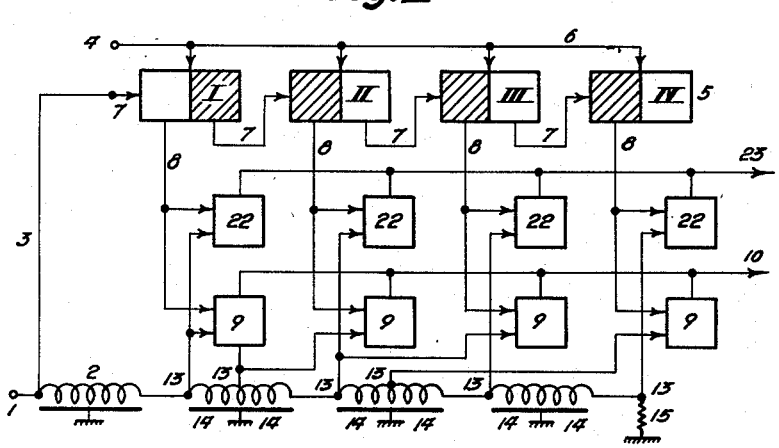
Fig. 2 is a similar arrangement to that of Fig. 1 but in which two different outlinings may be formed.
Figure 4:
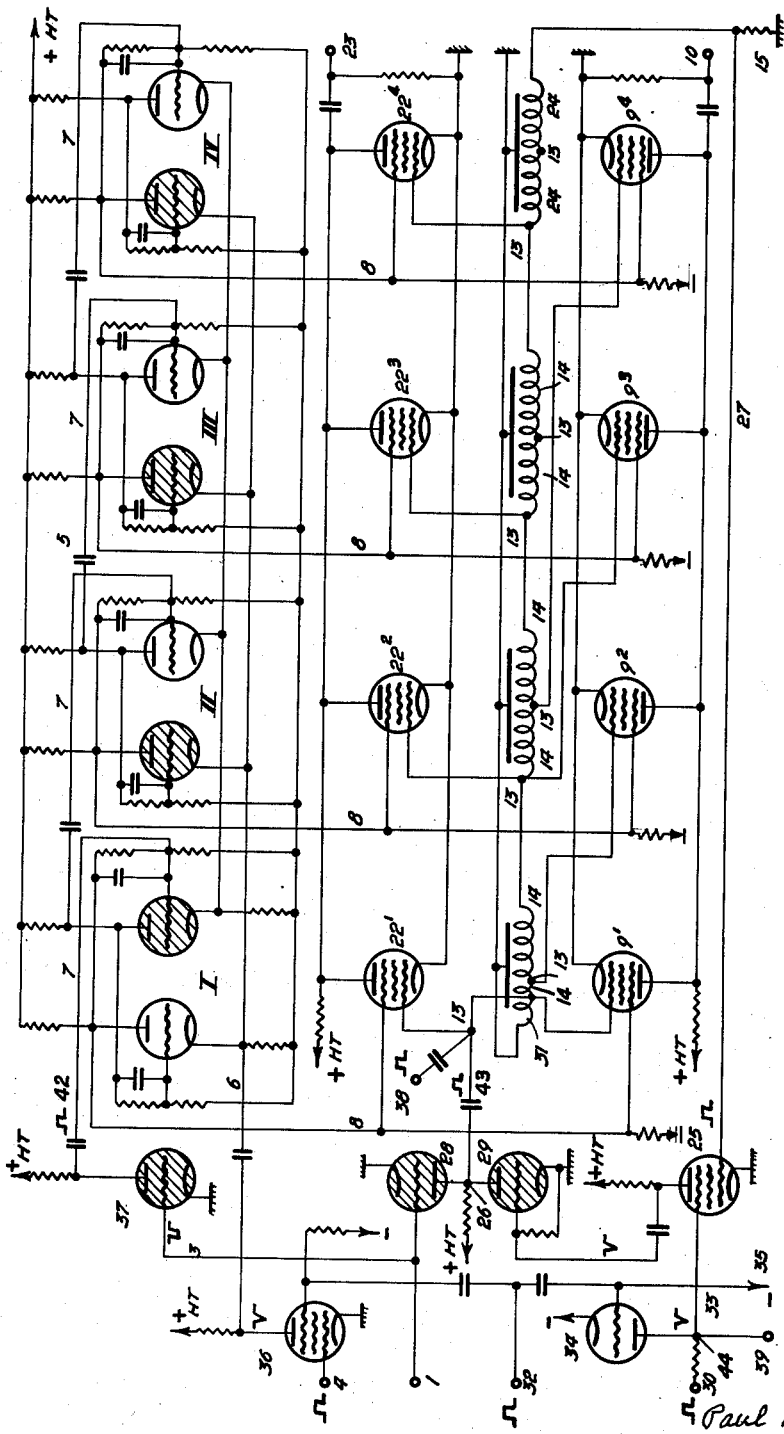
Fig. 4 is an electronic illustration of an outlining operator arrangement combining those shown in Figs. 2 and 3.

The arrangement of Fig. 3 is again illustrated in an electronic embodiment in Fig. 4 but incorporating therein the characteristic of a counting by pairs of impulses and double outlet of the arrangement shown in Fig. 2. This particular diagram is given, of course, only by way of illustration and, as such, it will be described supposing the outlining operator part of a calculating equipment in which the various precised auxiliary program signals are available, as usual; the manufacture of said equipments is, however, well known in the technics and their realization is rendered evident through the prior publications.

Here, again the delaying line used for the outlining comprises eight sections 14—14—24—24 of individual length $\theta$, and the code train incoming at 1 will, therefore, be supposed as having eight moments, the duration of interval T between two consecutive trains being, therefore, $8\theta$. On the input end, however, the line terminates in a short circuited quarter-wave section 31 in order to obtain a conversion of the impulses into signals with two polarities and thus to avoid the necessity of re-establishing the D. C. component in the regenerating stage 25 itself, which is followed by a connecting stage 29 supplying point 26 in order to reverse the polarity of the regenerated impulses. Connected to this point 26 is the plate of the reversing valve 28, the control grid of which is controlled by terminal 1; thus, both separation of the memory loop end of the inlet circuit and correct polarities of the signals in this loop are accomplished.

For regeneration, a grid of valve 25, for example, the suppressor, receives at 30 through a convenient loading resistor the recurrent impulses of timing $\theta$ which are permanently generated for distribution in the calculator (which impulses are generally called rapid timing impulses) so that in the absence of a particular control, any train introduced into the memory loop is normally maintained. Valve 34 is normally inoperative, or locked, through the bias which is applied onto it at 35 through conductor 33.

Valve 36 is also normally maintained locked by negative potential applied to its suppressor grid, so that the counting impulses permanently applied onto terminal 4 and, accordingly, to the control grid of valve 36 cannot reach the actuating channel 6 of counter 5.

Each time a coded train is to be introduced, it is applied onto terminal 1 during a time interval T and during this same time a signal generated by the program device of the calculator from the usual slow timing generator is applied positively onto terminal 32 thus unlocking both valves 36 and 34. Valve 36 then allows the counting impulses to go through and these impulses reach 6 during this time T; valve 34 applies onto the suppressor of valve 25 a voltage which opposes the (positive) rapid timing impulses incoming at 30, and, accordingly, valve 25 will be locked and the cancelling of the train previously registered in the memory loop will be insured simultaneously with the introduction of the new coded train through valve 22 into the delaying line. After registration of the train, voltage 32 is removed by the program control and the maintenance is normally insured anew. There is no need to return counter 5 to zero through other particular means than those which are provided for the normal operation of the outlining. Indeed, in the course of any introduction of a coded train, the counter is operated in the following way:

The recurrent series of impulses applied at 4 is of a timing $2\theta$ and its first impulse applied to path 6 of the counter coincides in time with the first moment of the incoming train; this series of counting impulses is obtained, for example, by removing the impulses at the even moments of the aforementioned rapid timing. Its impulse level is comparatively small although sufficient to cause the open counting chain of stages I to IV to progress regularly by one step through controlling the cathodes of one of their paired valves by these timing impulses with slow timing.

The arrangement of the flip-flop stages is self-understandable from the drawing and corresponds, moreover, to a typical step-by-step arrangement in which, in no case, can all the stages be in the same condition, for example, have all their valves (either right or left) unlocked and their other valves (either left or right) locked, and one of these stages necessarily shows a reverse condition with respect to that of the others.

In such counters it is well known that if an impulse of a sufficient high level with respect to the level of control impulses through the cathodes is applied to the input of their first stage through the control grid of their second valve (that is not energized through the cathode) the counting channel automatically returns to the general zero condition, the first rocking stage alone being actuated, by the provision of a connection such as shown at 7 for the said return-to-zero impulse.

In order to perform a correct counting according to the invention, it is, therefore, sufficient to insure that the impulses of the entering coded train are of an amplitude level which is clearly higher than that of the counting impulses. The remainder of the operation of the circuit is, therefore, clear according to the preceding descriptions of Figs. 1 to 3.

However, the circuit of Fig. 4 may also be used as an order operator, once a first train is outlined, provided that the introduction of a new train for which the counting is not performed may be insured without modifying the condition of the counter obtained for the outlining. This may be done through the simple provision of two additional terminals 38 and 39; terminal 38 directly controlling the inlet 13 of the outlining line makes it possible to cause a train to go through the line without controlling counter 5; at the same time that this train is introduced, the train which was recorded and maintained in the memory loop is cancelled through rendering valve 25 inoperative which may be locked through a voltage applied at 39. Such an auxiliary arrangement which does not complicate the outlining operator makes it possible, if desired, to do away with the outlining line 20 (Fig. 1), and, accordingly, eliminate switches 11 of the same figure, since the train issuing from 10 (or 23) after working at 16, may be returned directly or through a predetermined delay at 18, directly onto the inlet 38 of the operator. According to whether the cancelling signal will be maintained at 39 during a time T after the passage of said second train, or not, this second train will be introduced, or not introduced, into the memory loop in the place of the original train.

It is to be pointed out that, furthermore, it is not necessary, for the normal introduction of a coded train through terminal 1 for substituting a prior train, to begin with returning the step-by-step counter to zero, since the first existing impulse of the new coded train insures the re-setting operation by itself. In any case, the introduction of a train is insured simultaneously with the cancelling of the previously recorded train during the same slow timing period T of the registering operator.

Since the operation of the counter in Figs. 1 to 4 is the same in all cases except for the frequency of the pulses applied at 4, a detailed description of Fig. 4 will be given for a specific example in which $m$ is equal to 2, N is equal to 8, K is equal to 2, and the incoming train applied at 1 is coded in eight moments and represents the binary number 01000000, corresponding to the decimal number 2. Thus, $N-K=6$, and $$n = \frac{N-K}{m} = 3$$

Also, $2^{mn}=2^6$ and $2^n=2^3$.

Figure 5:
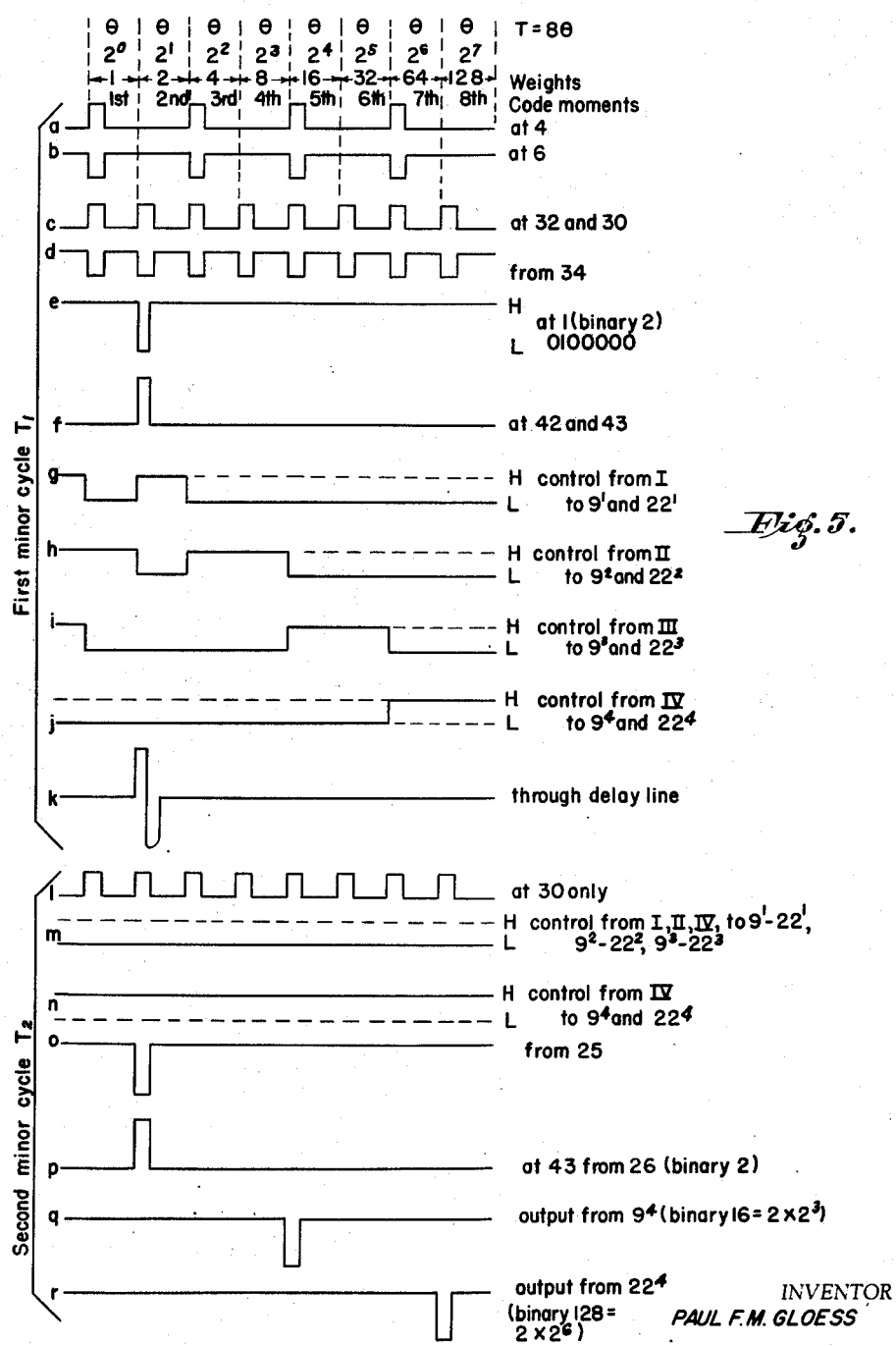
Fig. 5 is a series of pulse curves illustrating the operation of Fig. 4.

As shown in Fig. 5, the operation is in two minor cycles. The operation during the first minor cycle, T1, is as follows: On terminal 4, is applied the double timing pulses $(a)$, Figure 5; the impulses of even moment are omitted in such a timing. The timing impulses being positive at 4, come out as negative pulses $(b)$, Fig. 5, at the triggering connection 6 of the step-by-step counter. They come out at 6 since the suppressor grid of tube 36 receives, during this minor cycle, the positive timing pulse $(c)$ applied at 32.

The positive timing pulse $(c)$ is also applied at 30, but it is cancelled by the pulse at 32 after being inverted at 34 and applied at 44; suppressor grid of tube 25 remains blocked. If there was a previous train in memory, it would not pass through tube 25.

Let it be supposed that, when starting, the counter is at rest: stage I is in abnormal condition; its right tube is conductive and its left tube is blocked. Tubes $9^1$ and $22^1$ are conductive and would thus transmit any signal applied to their control grids. The shifting of such a signal would be null, should such a signal exist.

Stages II, III, IV, on the other hand, are in a normal condition: their right tubes are blocked and their left tubes are conductive. The stages which they control, $9^2$—$22^2$, $9^3$—$22^3$, $9^4$—$22^4$, are not conductive.

Control of tubes 9 and 22 by the plates of the left tubes of flip-flop stages I to IV is a control by direct voltage.

The conducting tubes in such a general condition are hatched in Figure 4. Such hatchings also appear in the squares of flip-flop stages which schematically appear on Figs. 1–3.

At the first moment of the code of minor cycle T1, (Fig. 5), the timing impulse $(b)$ in 6 unblocks the left tube of flip-flop stage I, the right tube of this stage is blocked and sends a positive impulse to the control grid of the right tube of stage II, which is blocked, and said stage II inverts its condition. The counter being in equilibrium, it remains in such a state. Tubes $9^2$ and $22^2$ associated to stage II are rendered conductive, but the other transfer tubes are not conductive since their control tubes in the flip-flops are then conductive.

Upon the second code moment, the existing impulse $(e)$ (Fig. 5) of the coded train to be shifted arrives at 1 and, after being inverted by tube 37, is applied at 42, through blocking of tube 37, and, at the same time, it blocks tube 28. The signal pulse is thus transmitted to the delay line to be memorized.

The signal pulse will travel along this line in the form of the double polarity signal $(k)$ indicated in Fig. 5 by operation of the short-circuited line section 31 which causes a negative impulse delayed by $\theta/2$ to follow an incoming positive impulse.

At 42, the signal impulse of the coded train reaches the control grid of the right tube of flip-flop stage I as a positive pulse $(f)$ and causes this tube to become conductive, thereby triggering flip-flop stage I which comes back to its abnormal condition. The equilibrium of the counter then brings stage II back to its normal condition. Tubes $9^1$ and $22^1$ are again conductive and the other tubes 9 and 22 are not conductive.

In Figure 5, the variations of the plate voltages of the left tubes of the flip-flop stages have been indicated, which control transfer tubes 9 and 22. H indicates high voltage and L indicates low voltage.

Upon the third code moment, a timing impulse arrives at 4, is transferred by tube 36 and actuates the progression of the counter in the manner already stated for the first code moment. After such an impulse, the counter remains with its stage II in abnormal condition and its other stages in normal condition.

Should a coded train impulse have existed at the same instant, the latter, by means of the control grid of the right tube of stage I would have prevented the triggering. In Fig. 5, a larger amplitude of the signal pulse $(f)$ of the coded train has been indicated for this purpose (right tube being maintained conductive).

At the fourth moment of the code nothing happens.

At the fifth moment a new timing impulse again causes the counter to advance by one step: stage III is in abnormal condition, tubes $9^3$ and $22^3$ are conductive, the other tubes 9 and 22 then not being conductive. The impulses delivered by the right tube of stage II causes the progression of the counter through unblocking of the right tube of stage III, and stage II comes back to its normal condition since it triggers because of its left tube becoming unblocked.

At the sixth moment of the code, nothing happens.

At the seventh code moment, the counter progresses by one step because of the action of the timing impulse at 6. The operation is identical. Stage IV of the counter takes up an abnormal condition, the left tube is blocked, the right tube is unblocked. Tubes $9^4$ and $22^4$ are conductive and tubes 9 and 22 controlled by the other stages are not conductive.

At the eighth moment of the code, nothing happens.

At the end of the first minor cycle T1, the outlining is memorized and determined; thus, only tubes $9^4$ and $22^4$ are conductive.

During the second minor cycle T2, the memorized coded train must be retransmitted and outlined. Only the rapid timing impulses $(c)$ are applied at 30 so that tube 25 will be conductive and the memory loop will be closed. The coded train pulse $(o)$ is delivered by this tube 25 to the control grid of tube 26 which retransmits it at 43 to the delay line, see $(p)$, Fig. 5.

Control grid of tube $9^4$ (conductive) being connected to the fourth tap 13 of the delay line, the coded train pulse entering at 43 will come out at $9^4$ with a delay of three code moments, $3\theta$, with regard to its input at the input of the line in this minor cycle T2, see $(q)$, Fig. 5. Its binary code, which represented number 2, or 01000000, will then appear at 10 as representing binary number 16, i. e., 00001000. This is indeed the result of the multiplication of the first code 2 by number $2^n=2^3=8$.

Control grid of tube $22^4$ (conductive) is connected to the seventh tap of the delay line. The coded train pulse entering at 43 will come out at $22^4$ with a delay of six code moments with regard to its application at the input of the line at this minor cycle T2, see $(r)$, Fig. 5. Its binary code then appears at 23 as representing binary number 128, i. e., 00000001, the product of the multiplication of code 2 by number $$2^{mn}(2^{mn}=2^{3\cdot2}=2^6=64)$$

As long as the memory loop is effective, these outlined trains will be delivered at each consecutive minor cycle by the described device.

However, should the memory loop be interrupted, by suppressing the timing pulses at 30, and should the counter remain uncontrolled, in the outlining position, it is evident that any coded train, of any configuration, applied at 38 to the delay line, will come out on the one hand at 10 shifted by $3\theta$, and on another hand, will come out at 23 shifted by $6\theta$. The train coming out at 10 will have had its numerical code multiplied by 8, and the outcoming train at 23 will be multiplied by 64. Whence the possibility of using the device as an operator for changing the order of any coded train under the control of a particular coded train applied at 38.

This explanation of the operation and of the constitution of Fig. 4 is valid for Fig. 3, and for Fig. 2 except that no train follows the line of Fig. 4, since the storage is effectuated by the auxiliary memory line.

In Fig. 1, however, an additional group of switch tubes 11 have been represented, which, though they are controlled by the outlining counter, must be connected to a separate delay line, 18—19—19—19.

The arithmetical operator 16 may be neglected and the reoutlining of this sub-unit may be explained quite independently from said operator 16: There is only to consider that, when the counter is actuated, it produces an outlining in one direction for any coded train going through line 13—13—13, the first code moment of this train coinciding with the first code moment of a minor cycle at the input 50, of said line 13—13—13. It will also independently cause an outlining in a direction reverse to the first one for any coded train in line 18—19—19—19 and entering at 51 in section 18 with its first code moment coinciding with the first code moment of a minor cycle. Indeed, let us consider a coded train representing number 2, but with four code moments only for Fig. 1, i. e., 0100, read from left to right.

In reconsidering the outlining operation: Upon the minor cycle T1, the timing at 4 being normal, i. e., with an impulse at each code moment, the counter advances by one step at the first code moment, comes back by one step (comes back to zero) at the second code moment, advances by one step (comes back to position 1) at the third code moment, advances again by one step at the fourth code moment. Finally, stage III remains in an abnormal condition and tubes $9^3$ and $11^3$ are the only conductive tubes in their respective series.

Coded train 0100 then entering at 50 at the next minor cycle T2, will come out at 10 in the form of coded train 0001. It is the direct outlining operation which has been described.

Let us suppose that the device is not actuated and that, at a later minor cycle T$k$, this same train 0001, which has been delayed only by $k-1$ minor cycles, for example, be applied at 51. This is to show that both outlinings are reciprocal one with regard to the other, according to whether the train to be outlined is applied at 50 or at 51.

In order to reach output connection 12, train 0001 applied at 51 must cross delaying section 18, of an electrical length $\theta$, and a delay section 19, of the same electrical length $\theta$. It will thus be delayed by $2\theta$ and, in the minor cycle T$k$, no impulse will come out at 12.

On the contrary, the impulse which is present in the train at the fourth code moment of the minor cycle T$k$ will arrive at $11^3$, passing therefore to 12 at the second code moment of the following minor cycle T$_{k+1}$. In such a minor cycle T$_{k+1}$, the train issued at 12 will then be 01000, which represents binary number 2.

In such a case, $N=4$, $K=2$, and therefore $N-K=2$ with $m=1$, $n=2/1=2$, whence $2^{mn}=2^2$.

The value of the train applied at 51 was $2^3=8$, which value was divided by $2^2$ to become $2^1=2$. It is quite normal to consider the minor cycle according to the application, since, for a division by $2^p$, a coded train could not be "advanced," but delayed.

Of course, various modifications in the carrying out of the method may be taken into consideration without departing from the scope and spirit of the invention, as, for example, the choice of a step-by-step counter of another known construction in order to meet the aforementioned conditions, a larger number of the outlining outlets, and the like.

What I claim is:

1. In a system for outlining a coded train of electric impulses, the combination of a step-by-step counter having an actuating circuit and a re-setting circuit and being formed of a plurality of stages each provided with an output circuit, a source of recurrent pulses for energizing said actuating circuit, an input circuit for said train of coded pulses, a branch connection from said input circuit for energizing said re-setting circuit by said coded train to re-set said counter by each pulse in said train, a delay line connected to said input circuit for receiving said coded train, an output terminal for said coded train, a series of normally open switches connected to be actuated by the output circuits of said counter stages, one switch being provided for each stage of said counter, and means for completing connections from said output terminal to spaced points on said delay line through said switches.

2. A system according to claim 1, and including a second output terminal, a second series of normally open switches actuated by the output circuits of said counter, and means for completing connections from said second output terminal through said second switches to spaced points on said delay line having a different interval of spacing from the interval of the points of connection through said first series of switches.

3. A system according to claim 1, and including a second delay line interposed between said input circuit and said first mentioned delay line having a delay period equal to the maximum duration of a coded train.

4. A system according to claim 1, and including a memory loop connected between the output end of said delay line and the input end thereof, said memory loop including means for generating said coded train, and a unidirectional conductive device interposed between said input circuit and the input end of said delay line.

5. A system according to claim 4, and including an input circuit for a second coded train of impulses connected directly to the input end of said delay line, whereby said second train of impulses does not control said counter.

6. In a system for outlining a coded train of electric impulses, the combination of a step-by-step counter having an actuating circuit and a re-setting circuit and being formed of a plurality of stages each provided with an output circuit, a source of recurrent pulses for energizing said actuating circuit, an input circuit for said train of coded pulses, a branch connection from said input circuit for energizing said re-setting circuit by said coded train to re-set said counter by each pulse in said train, a delay line connected to said input circuit for receiving said coded train and having a delay equal to the maximum period of the coded train, a second delay line connected to the end of said first delay line, an output terminal for said coded train, a series of normally open switches connected to be actuated by the output circuits of said counter stages, one switch being provided for each stage of said counter, means for completing connections from said output terminal to spaced points on said second delay line through said switches, a third delay line, means connecting said output terminal to the input of said third delay line, a second series of normally opened switches actuated by the output circuits of said counter, a second output terminal, and means for completing connections from said second output terminal through said second switches to spaced points on said third delay line.

7. A system according to claim 6 wherein said first output terminal is connected to the third delay line through an operator device for combining a second coded train with the train supplied from said first output terminal.

8. In a system for relaying a received train of coded impulses formed of a number of pulses occurring within a period of time T having a maximum number of coding moments of the same duration, the combination of means for storing said received train, and means controlled by said received train for re-transmitting said stored train after a time delay proportional to the number of coding moments in the period T following the last pulse of said received train.

9. In a system for relaying a received train of coded impulses formed of a number of pulses occurring within a period of time T having a maximum number of code moments of the same duration, the combination of means for storing said received train, counting means controlled by said received train for counting the number of coding moments in the period T following receipt of the last pulse of said train, and means controlled by said counting means for re-transmitting said stored train after a time delay proportional to the number of counted moments.

10. The method of controlling the transmission of an impulse train formed of a plurality of pulses occurring within a period of time T containing a maximum of coding moments N each of a duration $\theta$, which method includes the steps of counting the number of coding moments in the period T following the last pulse of said train, and delaying the transmission of said train in accordance with the number of moments so counted.

11. The method of outlining an impulse train formed of a plurality of pulses occurring within a period of time T containing a maximum number of coding moments N each of a duration $\theta$, which method includes the steps of delaying the transmission of said impulse train, counting the number of coding moments at which no impulse appears following the last pulse of said train in the time T, and controlling the amount of delay of said train in accordance with the number of moments so counted.

12. A method for outlining an impulse train having N coding moments, in relation with the last moment N of a period T such that $T=N\theta$, $\theta$ being the duration of one moment, and in correlation with the spacing between the rank of moment K and said moment N, comprising the steps of counting from the first moment of said train and during N consecutive moments all the groups of moments at which no impulse appears, and starting again from zero each time an impulse appears in the train, the number of moments in a counting group being determined by the choice of the value of number $m$, registering said number $n$ thus obtained as a counting result, and introducing in the transmission of the train and after a delay $N\theta$, a delay $nm\theta$, where $m\theta$ represents the duration of a group of moments.

No references cited.